(12) United States Patent
Purio

(10) Patent No.: US 6,357,376 B1
(45) Date of Patent: Mar. 19, 2002

(54) BOAT DRAIN ASSEMBLY

(76) Inventor: Walt Purio, 891 Cypress Point Dr., Banning, CA (US) 92220

( * ) Notice: Subject to any disclaimer, the term of this patent is extended or adjusted under 35 U.S.C. 154(b) by 0 days.

(21) Appl. No.: 09/259,468

(22) Filed: Feb. 26, 1999

(51) Int. Cl.$^7$ .............................................. B63B 13/00
(52) U.S. Cl. ..................................... 114/197; 114/183 R
(58) Field of Search ......................... 114/183 R, 197, 114/198

(56) References Cited

U.S. PATENT DOCUMENTS

| | | | | |
|---|---|---|---|---|
| 412,982 A | * | 10/1889 | Schenck ..................... | 114/197 |
| 1,079,627 A | * | 11/1913 | Adams ........................ | 114/197 |
| 2,367,718 A | * | 1/1945 | Farrell ........................ | 114/197 |
| 5,385,108 A | * | 1/1995 | Thompson .................. | 114/197 |

* cited by examiner

Primary Examiner—Stephen Avila
(74) Attorney, Agent, or Firm—Knobbe, Martens, Olson & Bear, LLP

(57) ABSTRACT

The present invention relates to boats and watercraft and, more particularly, concerns an improved drain assembly for draining water out of interior compartments of boats and watercraft while preventing water from entering the interior compartment when the watercraft is positioned in the water.

4 Claims, 4 Drawing Sheets

BOAT DRAIN ASSEMBLY

BACKGROUND OF THE INVENTION

1. Field of the Invention

The present invention relates to boats and watercraft and, more particularly, concerns an improved drain assembly for draining water out of interior compartments of boats and watercraft while preventing water from entering the interior compartment when the watercraft is positioned in the water.

2. Description of the Related Art

Boating is a very popular hobby within the United States. Each year thousands of people take speedboats, sailboats, personal watercraft and the like out onto lakes and rivers and oceans in this country. As these watercraft are operated, water often accumulates in interior compartments of the boat. Further, boat operators will often clean these interior compartments which can also result in accumulations of water within the interior compartments of the boat. Consequently, drains and drain valves are often installed in the interior compartment of the boats so that water accumulated therein can be drained outside of the boat.

For example, in a typical speedboat, a drain assembly drains water from the passenger compartment through the stern wall of the boat to the exterior of the boat. The drain assembly generally consists of a hole through the stern wall of the boat that is plugged at one end. When the boat operator wishes to drain water out of the boat, the boat operator simply removes the plug and the water in the passenger compartment then drains through the drain assembly. Typically, the plug is a screw in plug that is screwed into threads that are formed in an interior passage of the drain assembly.

One problem associated with drain assemblies of the prior art is that the boat operator may forget to replace the plug after draining the water out of the interior compartment of the boat. For example, it is common for boat operators to open the drains after the boat has been placed on the trailer to allow the water to drain out of the interior compartments after the boat has been removed from the water. If the boat operator forgets to replace the plug, water can then enter the interior compartments of the boat the next time the boat is positioned in the water. In fact, water can enter through the drain in sufficient quantities that the boat can sink and, in this country, literally hundreds of boats are lost each year as a result of this occurrence.

One solution to this problem is a one-way drain assembly that incorporates a flapper valve. This device includes an aperture that extends through a wall of the boat wherein a valve member is mounted within the aperture in a pivoting fashion. Preferably, the valve member can only pivot so as to open the aperture in response to water flowing from the boat compartment to the exterior of the boat. Further, the valve member is configured so that when water is flowing from the exterior of the boat into the interior of the boat, the valve member closes off the aperture and prevents the water from entering the boat.

While the flapper type drain valve reduces the likelihood of water entering the interior compartments of the boat after the boat operator has failed to reinstall a plug, these devices suffer from some problems. In particular, these devices are typically made of a plastic that degrades as a result of exposure to UV light. Consequently, sunlight often damages these devices to a point where the valve member breaks and does not close off the aperture when needed. Further, these devices are also exposed to oil and other foreign matter within the water which inhibits the correct pivoting motion of the flapper valve member to the point where the valve member does not adequately seal the boat. For example, the foreign matter may cause the flapper to get stuck in a fixed position which either inhibits proper operation of the drain or allows water to flow through the drain into the boat.

Hence, even though the flapper-type drain valves represent an improvement over the standard drains that simply incorporate a plug, it still suffers from serious shortcomings in its ability to prevent water from entering interior compartments of the boat when the boat is positioned in a body of water.

From the foregoing, it should be apparent that there is a need for an improved drain valve for boats that will prevent water from entering the boat when a plug has failed to be inserted into the drain valve.

SUMMARY OF THE INVENTION

The aforementioned needs are satisfied by the improved drain valve assembly of the present invention which is comprised of a drain valve assembly that can be positioned within an opening in a wall of the boat wherein the assembly defines a central opening or passageway that extends through the wall of the boat. The central passageway includes a reduced aperture portion that has a cross-sectional area which is less than the cross-sectional area of the central passageway. A ball is positioned within the central passageway and is captured therein so as to be positioned adjacent the reduced aperture. Preferably, the ball is captured within the central passageway in a position wherein it floats such that when water is flowing through the reduced aperture from an interior compartment of the boat to the exterior of the boat, the ball is urged away from the reduced aperture so that water can flow through the reduced aperture and the central passageway of the assembly. Conversely, when water is flowing from the exterior of the boat into the interior of the boat, the ball is then urged into the reduced aperture thereby inhibiting the flow of water from the exterior of the boat to the interior of the boat through the central passageway.

It will be appreciated that the improved drain valve assembly of the present invention inhibits water flow from the exterior of the boat into an interior compartment through the use of a free-floating ball that is captured within the central passageway of the drain valve. The use of the floating ball reduces the likelihood of failure of the valve as there are no pivoting members which can be broken by repeated use and fatigue. Further, the floating ball is also less likely to be stuck by oil or some other foreign matter in a fixed position. Hence, the assembly is configured to prevent water from flowing into the boat or watercraft when the boat or watercraft is positioned in the water. These and other objects of the present invention will become more fully apparent from the following description taken in conjunction with the accompanying drawings.

DETAILED DESCRIPTION OF THE PREFERRED EMBODIMENT

Figure 1:
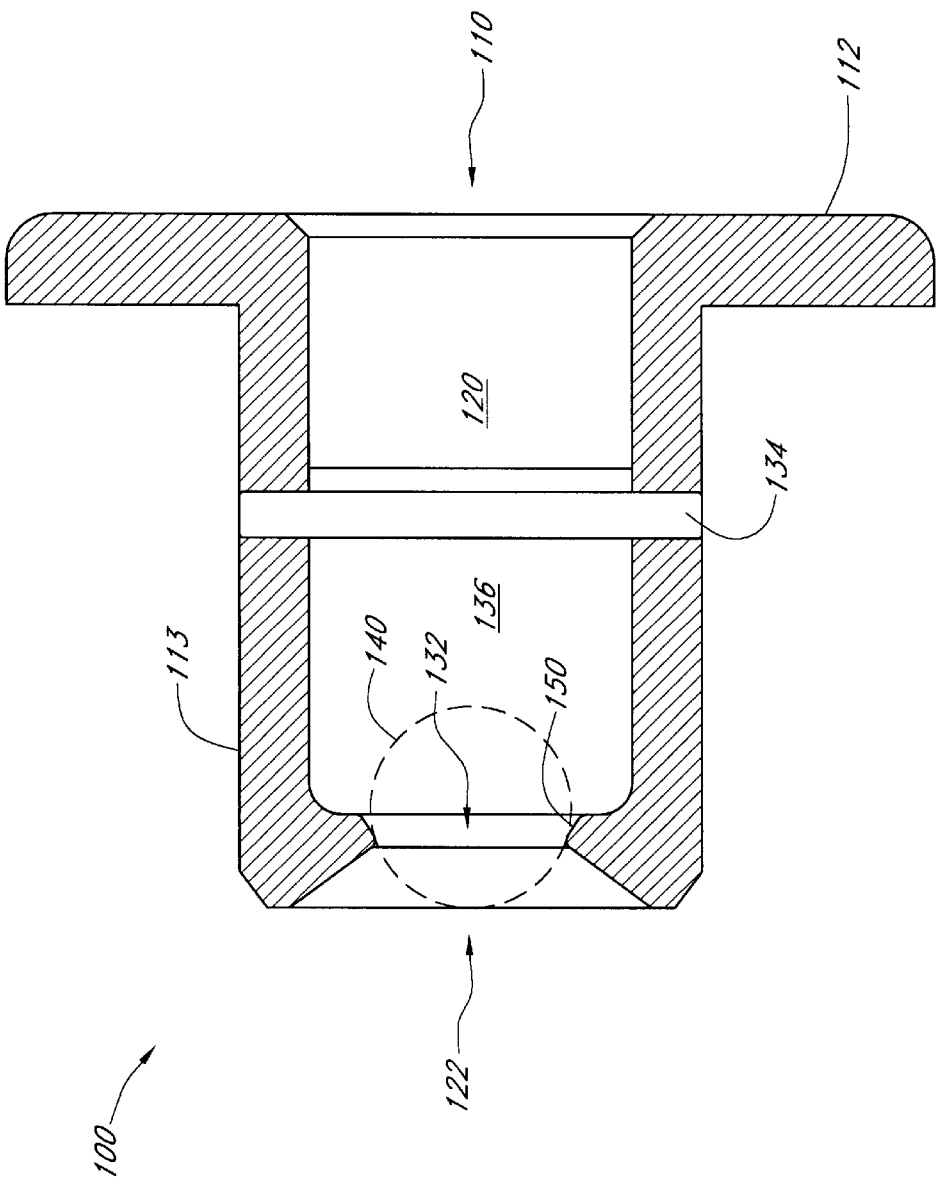
FIG. 1 is a side sectional view of a preferred embodiment of a improved drain valve.
Figure 2:
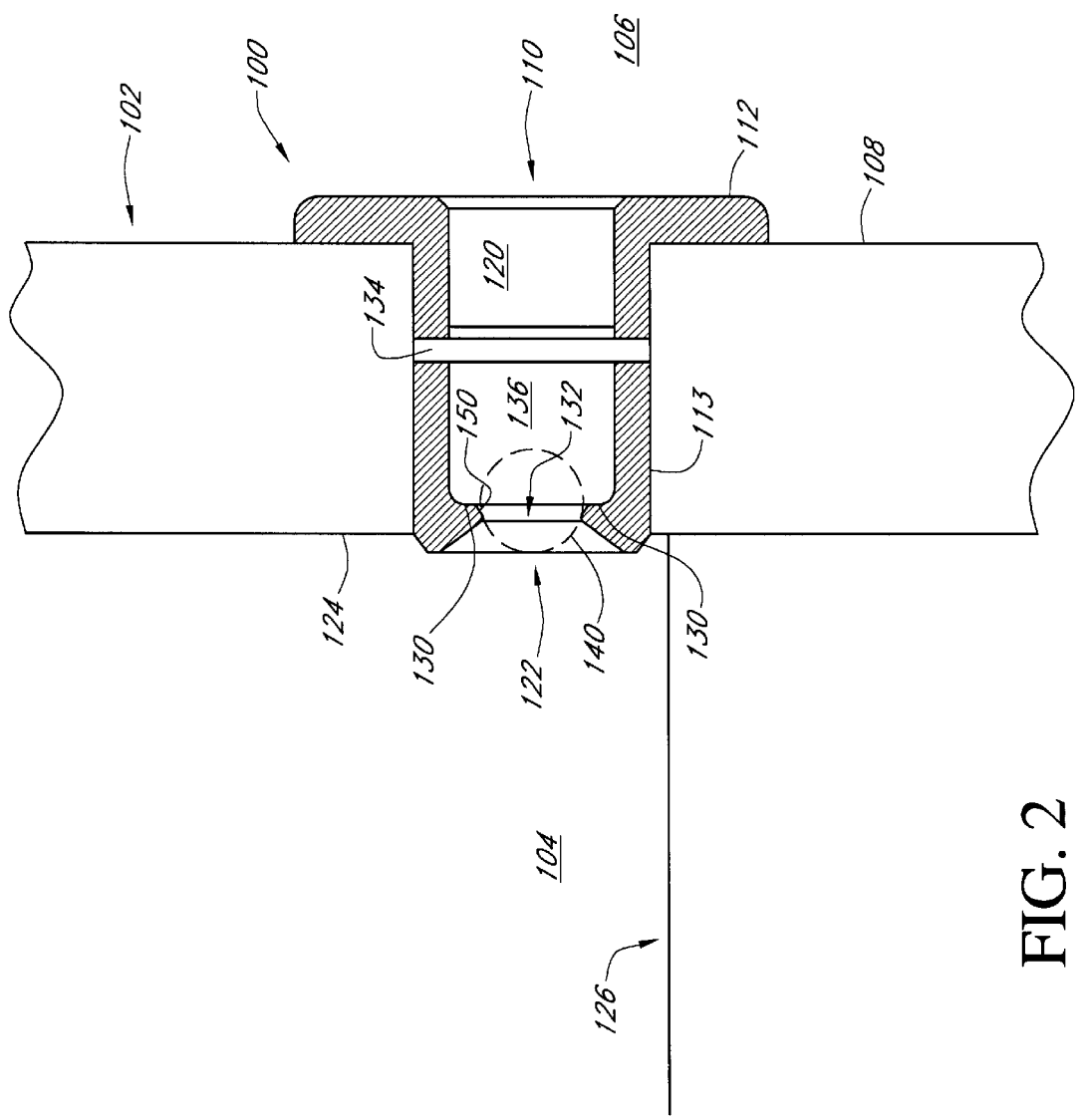
FIG. 2 is a side sectional view of the improved drain valve of FIG. 1 mounted in a wall of a boat.

Reference will now be made to the drawings wherein like numerals refer to like parts throughout. Referring initially to FIGS. 1 and 2, the components of an improved drain valve assembly 100 of the preferred embodiment will be described. In particular, the improved drain valve 100 is configured to be mounted in a wall 102 of the boat between an interior compartment 104 of the boat and the exterior of the boat 106. The drain valve assembly 100 includes an exterior opening 110 that is surrounded by an annular flange 112 that is designed to be positioned about the outer surface 108 of the boat wall 102. The improved drain valve assembly 100 also defines a central opening or passageway 120 that extends from the exterior opening 110 inward into an interior opening 122 that is positioned adjacent an inner surface 124 of the boat wall 102. Preferably, the improved drain valve assembly 100 is mounted so that the interior opening 122 is positioned adjacent a floor or bottom surface 126 of an interior compartment 104 of the boat so that water that accumulates in the interior compartment 104 can enter the opening 122 and flow through the passageway 120 to the exterior opening 110 of the drain valve 100 so that the water within the interior compartment 104 can drain to the exterior 106 of the boat.

Positioned within the central aperture 120 is an annular lip 130 that extends inward from the interior walls of the central passageway 120 so as to define a reduced aperture 132 within the central passageway 120. Further, a pin 134 is positioned so as to extend through the center of the central passageway 120 of the drain valve assembly 100 so as to define a capture area 136 within the central passageway 120 that is bounded by the interior walls of the central passageway 120, the annular lip 130 and the pin 134. A ball 140 (shown in phantom) is preferably positioned within the capture area 136 of the central aperture and the ball 140 is dimensioned so that the cross-sectional area of the ball 140 is greater than the cross-sectional area of the reduced aperture 132 but is less than the cross-sectional area of the central passageway 120. The ball 140 is thereby free to float within the capture area 136 when water is flowing through the central passageway 120.

Specifically, when water is flowing from the interior compartment 104 of the boat to the exterior 106 of the boat through the central passageway 120, the ball 140 is urged towards the pin 134 and away from the reduced opening 132. Hence, water can freely flow from the interior compartment 104 through the central passageway to the exterior of the boat thereby draining the boat. Alternatively, when water is flowing from the exterior 106 of the boat through the passageway 120 towards the interior compartment 104, the ball 140 is urged by the resulting water pressure into the reduced opening 132 so that the ball 140 is seated within the reduced opening 132 to thereby prevent water from flowing into the interior compartment 104 of the boat. In the preferred embodiment, the inner edges 150 of the reduced opening 132 are angled so that the ball 140 can be flushly positioned within the opening 132 to form a generally watertight seal.

Hence, the improved drain valve of the preferred embodiment prevents water from flowing into the interior compartment 104 of the boat by the use of a free-floating ball that is captured within the central passageway that occludes a reduced aperture within the passageway when water is flowing inward into the boat. Consequently, when the boat operator fails to plug the drain valve opening 110, water is still prevented from flowing into the interior compartment of the boat. However, the floating ball permits water to freely flow from the interior compartment 104 outward to the exterior of the boat as the ball simply floats with the water current and allows the water to flow outward.

Figure 3A:
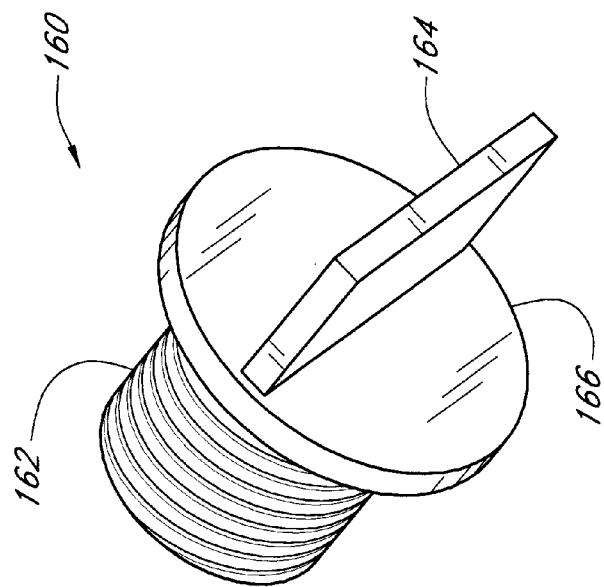
FIGS. 3A and 3B are reproductions of photographs of the components of the improved drain valve of FIG. 1.
Figure 3A:
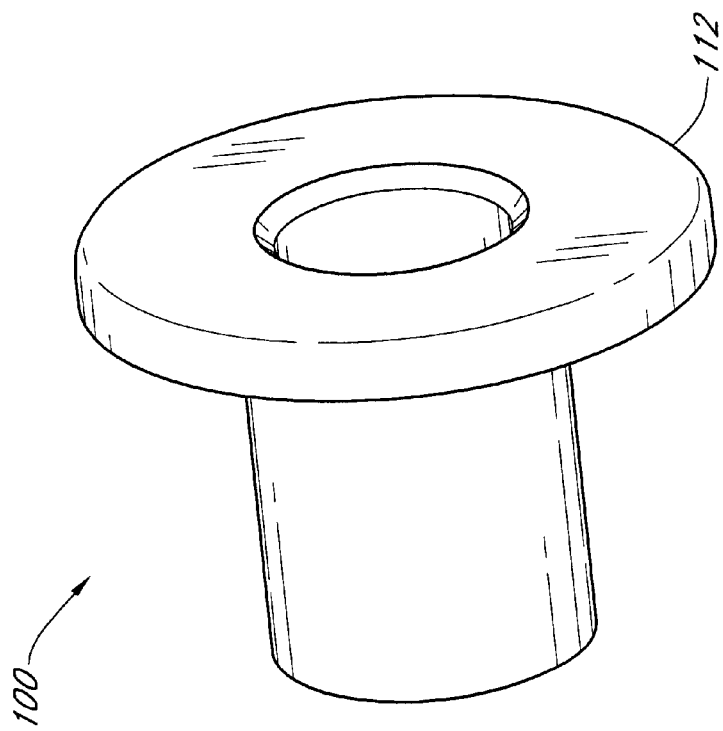
Figure 3B:
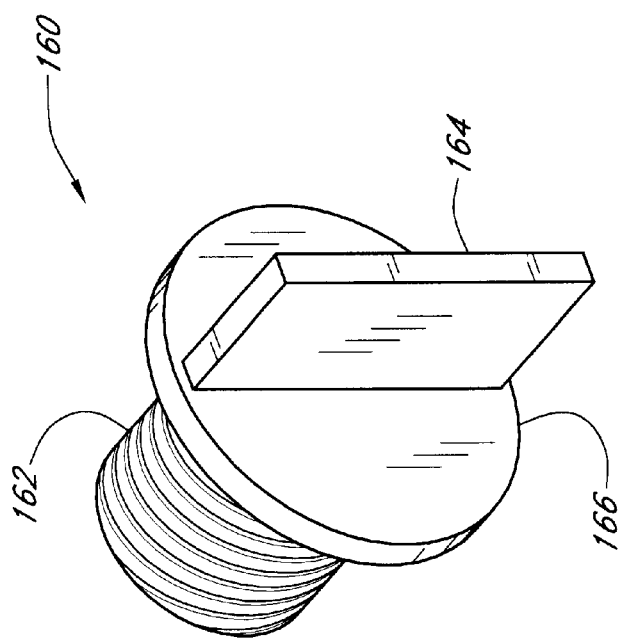
Figure 3B:
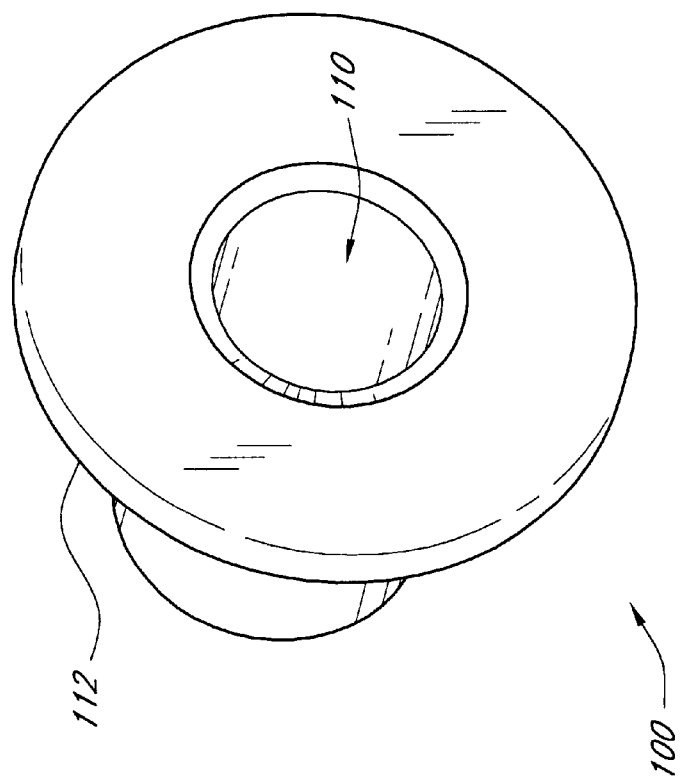

FIGS. 3A and 3B are photographs which illustrate the drain valve 100 and a plug 160 that is designed to be mounted in the exterior opening 110 of the drain valve. In particular, the plug 160 is threaded and matching threads (not shown) are formed in the interior surfaces of the central aperture 120 so that the plug can be screwed into the opening thereby preventing water from flowing through the central aperture 120 of the improved drain 100. The plug 160 is comprised of a threaded section 162 and a handle section 164 that is separated by a flange 166.

To install the improved drain assembly 100 of the preferred embodiment, there must be a hole drilled through the wall of the boat that matches the diameter of the cylindrical portion 113 (FIG. 1) of the assembly 100. The drain assembly 100 is then inserted through the hole so that the annular surface 112 rests against the exterior surface 108 of the wall. The assembly 100 is then secured via screws (not shown) that are positioned through the exterior flange 112 into the exterior surface 108 of the wall 102 of the boat.

FIG. 1 shows some dimensions of one embodiment of the assembly 100, however, a person of ordinary skill in the art will appreciate that the dimensions can vary depending upon the size of opening in the boat, and the desired size of drain opening of the assembly. Hence, the dimensions provided in FIG. 1 are simply illustrative of one embodiment and are not meant to limit the scope of the invention. The drain assembly of the preferred embodiment is therefore configured to be able to allow for draining of the boat while still preventing water from entering into the interior compartments of the boat from the exterior surface as a result of the free-floating ball moving into a positioned wherein the passageway for water through the assembly is fully occluded. Preferably, the ball 140 is made of a material such as nylon, the pin 134 is made of stainless steel and the assembly 100 is comprised of PVC plastic or some other material that is well suited for use in water environments.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof may be made by those skilled in the art without departing from the spirit of the present invention. Consequently, the scope of the invention should not be limited to the foregoing discussion, but should be defined by the appended claims.

What is claimed is:

1. A drain valve assembly that can be positioned within an opening in a wall of a boat comprising:

a member adapted to be positioned within the opening, the member having an upper end that is positioned substantially flush with an inner surface of the boat wall and defines an interior opening that extends across substantially the entire opening in the boat wall and is adapted for water to flow from an interior compartment of the boat to a central passageway defined by the member, wherein the central passageway extends through the wall of the boat when the member is positioned in the opening, the central passageway including a reduced aperture portion that has a cross sectional area which is less than the cross sectional area of the central passageway;

a ball that is positioned within the central passageway and is captured therein so as to be positioned adjacent the reduced aperture and retained within the central passageway within the wall of the boat, wherein the ball floats in the central passageway when water is flowing through the reduced aperture from the interior compartment of the boat to the exterior of the boat and wherein the ball is urged into the reduced aperture when water is flowing from the exterior of the boat into the interior compartment to thereby inhibit the flow of water from the exterior of the boat into the interior of the boat through the central passageway.

2. The drain valve assembly of claim 1 further comprising a plug that is mounted in an exterior opening of the drain valve wherein the plug inhibits water from the exterior of the boat from entering the central passageway.

3. A drain valve assembly that can be positioned within an opening in a wall of a boat comprising:

a member adapted to be positioned within the opening, the member defining a central passageway that extends through the wall of the boat when the member is positioned in the opening, the central passageway including a reduced aperture portion that has a cross sectional area which is less than the cross sectional area of the central passageway;

a ball that is positioned within the central passageway and is captured therein so as to be positioned adjacent the reduced aperture, wherein the ball floats in the central passageway when water is flowing through the reduced aperture from an interior compartment of the boat to the exterior of the boat and wherein the ball is urged into the reduced aperture when water is flowing from the exterior of the boat into the interior compartment to thereby inhibit the flow of water from the exterior of the boat into the interior of the boat through the central passageway;

a plug that is mounted in an exterior opening of the drain valve wherein the plug inhibits water from the exterior of the boat from entering the central passageway.

4. The drain valve assembly of claim 3 wherein the plug comprises a threaded section and a handle section that are separated by a flange wherein the threaded section permits the plug to be screwed into matching threads formed on an interior surface of the central passageway.

* * * * *